United States Patent
Nandwani et al.

(10) Patent No.: US 8,991,236 B2
(45) Date of Patent: Mar. 31, 2015

(54) RECONFIGURABLE LEAK TESTING SYSTEM

(75) Inventors: Sunil Nandwani, Troy, MI (US); Brian Holmes, Peterburg, MI (US); Christine Anne Blake, Royal Oak, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 246 days.

(21) Appl. No.: 13/611,547

(22) Filed: Sep. 12, 2012

(65) Prior Publication Data

US 2013/0031962 A1 Feb. 7, 2013

Related U.S. Application Data

(63) Continuation-in-part of application No. 13/195,517, filed on Aug. 1, 2011, now Pat. No. 8,720,253.

(51) Int. Cl.
*G01M 3/04* (2006.01)
*G01M 3/32* (2006.01)
*G01M 3/26* (2006.01)
*G01M 3/02* (2006.01)

(52) U.S. Cl.
CPC .............. *G01M 3/329* (2013.01); *G01M 3/04* (2013.01); *G01M 3/02* (2013.01); *G01M 3/26* (2013.01)
USPC ........................................................... 73/40

(58) Field of Classification Search
CPC ......... G01M 3/26; G01M 3/304; G01M 3/02; G01M 3/3263
USPC ........................................................... 73/40
See application file for complete search history.

(56) References Cited

U.S. PATENT DOCUMENTS

| | | |
|---|---|---|
| RE26,657 E | 9/1969 | Fitzpatrick et al. |
| RE26,661 E | 9/1969 | Fitzpatrick et al. |
| 4,813,268 A | 3/1989 | Helvey |
| 5,850,036 A | 12/1998 | Giromini et al. |
| 6,330,822 B1 | 12/2001 | Hawk et al. |
| 6,578,407 B1 | 6/2003 | McTaggart |
| 6,666,970 B1 | 12/2003 | Jornitz et al. |
| 6,966,216 B2 | 11/2005 | Hotta |
| 2005/0160794 A1 | 7/2005 | Sonntag et al. |

FOREIGN PATENT DOCUMENTS

| | | |
|---|---|---|
| DE | 2802645 A1 | 7/1979 |
| DE | 102004028875 A1 | 1/2006 |
| DE | 102006035943 A1 | 2/2008 |

*Primary Examiner* — Hezron E Williams
*Assistant Examiner* — Rodney T Frank

(57) ABSTRACT

A reconfigurable leak testing system is provided that includes a leak testing station and at least one off-shuttle cart removably attachable to the leak testing station. A fixture cartridge is translatable between the off-shuttle cart and the leak testing station. The fixture cartridge is configured to selectively couple with the leak testing station. The fixture cartridge includes an upper fixture, a lower fixture, and an actuatable testing feature. The fixture cartridge is configured to receive a part between the upper fixture and lower fixture. The actuatable testing feature is configured to contact the part. A closed volume is defined at least partially by the actuatable testing feature and the part.

18 Claims, 11 Drawing Sheets

US 8,991,236 B2

RECONFIGURABLE LEAK TESTING SYSTEM

CROSS-REFERENCE TO RELATED APPLICATIONS

This application is a continuation-in-part of U.S. patent application Ser. No. 13/195,517, filed on Aug. 1, 2011, which is herein incorporated by reference in its entirety.

TECHNICAL FIELD

The present invention relates to leak testing systems for automotive parts, and in particular, automated leak testing systems and methods for automotive parts.

BACKGROUND

The statements in this section merely provide background information related to the present disclosure and may or may not constitute prior art.

Casting is a metal forming technique that involves pouring molten metal into a hollow cavity of a mold, where the cavity is the negative of the desired part shape. As the molten metal cools in the cavity, it solidifies and may then be separated from the mold as a solid part. The casting process may be used to form relatively complex metal parts that may not be economical to produce by other methods. In particular, many complex automotive components, such as transmission cases and motor housings, may be fabricated through a casting process.

During the casting process, air bubbles in the molten metal, defects in the mold, and/or excessive shrinkage during cooling may create pits or other surface flaws in the final part. If these flaws occur in a sufficiently thin region of a shell-like component used to contain a fluid, they may result in micro-leaks through the body of the casting. It has been found that a pore/hole as small as 8 μm may allow oil to leak out of a cast transmission case. Therefore, cast parts may be quality inspected and/or leak checked following the casting process to ensure that no micro-leaks/pores exist.

Accordingly, the leak testing process may add time to the production cycle during the production of the components and their assemblies. Typically, a leak testing machine must be set up to accommodate a particular part, and time is wasted during such a process. In an automated production line, however, speed, flexibility and reconfigurability are desirable qualities.

SUMMARY

Rapid station reconfiguration as disclosed in the present disclosure may enable a production line to change from producing one part/component to an entirely different part/component in with losing significant time. Likewise, flexibility may allow for limited production runs using common capital equipment, which may reduce the overall expense associated with each respective part design.

A reconfigurable leak testing system includes a leak testing station, an off-shuttle cart removably attachable to the leak testing station, and a fixture cartridge that is translatable between the off-shuttle cart and the leak testing station. The fixture cartridge may be configured to selectively couple with the leak testing station and may include an upper fixture, a lower fixture, and an actuatable testing feature. The fixture cartridge may be configured to receive a part between the upper fixture and lower fixture, and the actuatable testing feature may be configured to contact the received part. A closed volume is defined at least partially by the actuatable testing feature and the part.

In another variation, which may be combined with or separate from other variations described herein, a reconfigurable leak testing system is provided that includes a leak testing station, a first off-shuttle cart, and a second off-shuttle cart. If desired, additional off-shuttle carts may also be provided and used with the leak testing system. The leak testing station has a first side and a second side. A first station docking feature is disposed adjacent to the first side, and a second station docking is disposed adjacent to the second side. The first off-shuttle cart is removably attachable to the first and second sides of the leak testing station. The first off-shuttle cart has a first cart docking feature configured to mate with the first and second station docking features to removably attach the first off-shuttle cart to the leak testing station. The first off-shuttle cart has a plurality of wheels attached to the first off-shuttle cart. The second off-shuttle cart is also removably attachable to the first and second sides of the leak testing station. The second off-shuttle cart has a second cart docking feature configured to mate with the first and second leak station docking features to removably attach the second off-shuttle cart to the leak testing station. Thus, the first off-shuttle cart may be removably attached to either the first or the second side of the leak testing station, and the second off-shuttle act may also be removably attached to either the first or the second side of the leak testing station. The second off-shuttle cart also has a plurality of wheels attached to the second off-shuttle cart.

In addition, a first fixture cartridge is translatable between the first off-shuttle cart and the leak testing station, and a second fixture cartridge is translatable between the second off-shuttle cart and the leak testing station. The first fixture cartridge is configured to selectively couple with the leak testing station, and the second fixture cartridge is configured to selectively couple with the leak testing station. The first fixture cartridge includes a first upper fixture, a first lower fixture, and a plurality of first actuatable testing features. The first fixture cartridge is configured to receive a first part between the first upper fixture and the first lower fixture, and the plurality of first actuatable testing features are configured to contact the first part. A first closed volume is defined at least partially by the plurality of first actuatable testing features and the first part. The second fixture cartridge includes a second upper fixture, a second lower fixture, and a plurality of second actuatable testing features. The second fixture cartridge is configured to receive a second part between the second upper fixture and the second lower fixture, and the plurality of second actuatable testing features are configured to contact the second part. A second closed volume is defined at least partially by the plurality of second actuatable testing features and the second part.

Furthermore, an automated conveyor system is configured to controllably translate the first and second fixture cartridges between the first and second off-shuttle carts respectively and the leak testing station. The automated conveyor system includes a station track attached to the leak testing station and first and second cart tracks attached to the first and second off-shuttle carts respectively. The station track and the first cart track are configured to cooperate to translate the first fixture cartridge between the first off-shuttle cart and the leak testing station, and the station track and the second cart track are configured to cooperate to translate the second fixture cartridge between the second off-shuttle cart and the leak testing station.

In yet another variation, which may be combined with or separate from the other variations described herein, a method of leak testing a part using a reconfigurable leak testing system is provided. The method includes a step of wheeling an off-shuttle cart to a location adjacent to a leak testing station and a step of removably attaching the off-shuttle cart to the leak testing station. In addition, the method includes a step of automatically translating a fixture cartridge into the leak testing station, the fixture cartridge being provided with upper and lower fixtures. Further, the method includes steps of receiving a part between the upper and lower fixtures, establishing a closed volume within the part, pressurizing the closed volume using a pressurized fluid, and monitoring the pressurized fluid to detect fluid leakage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
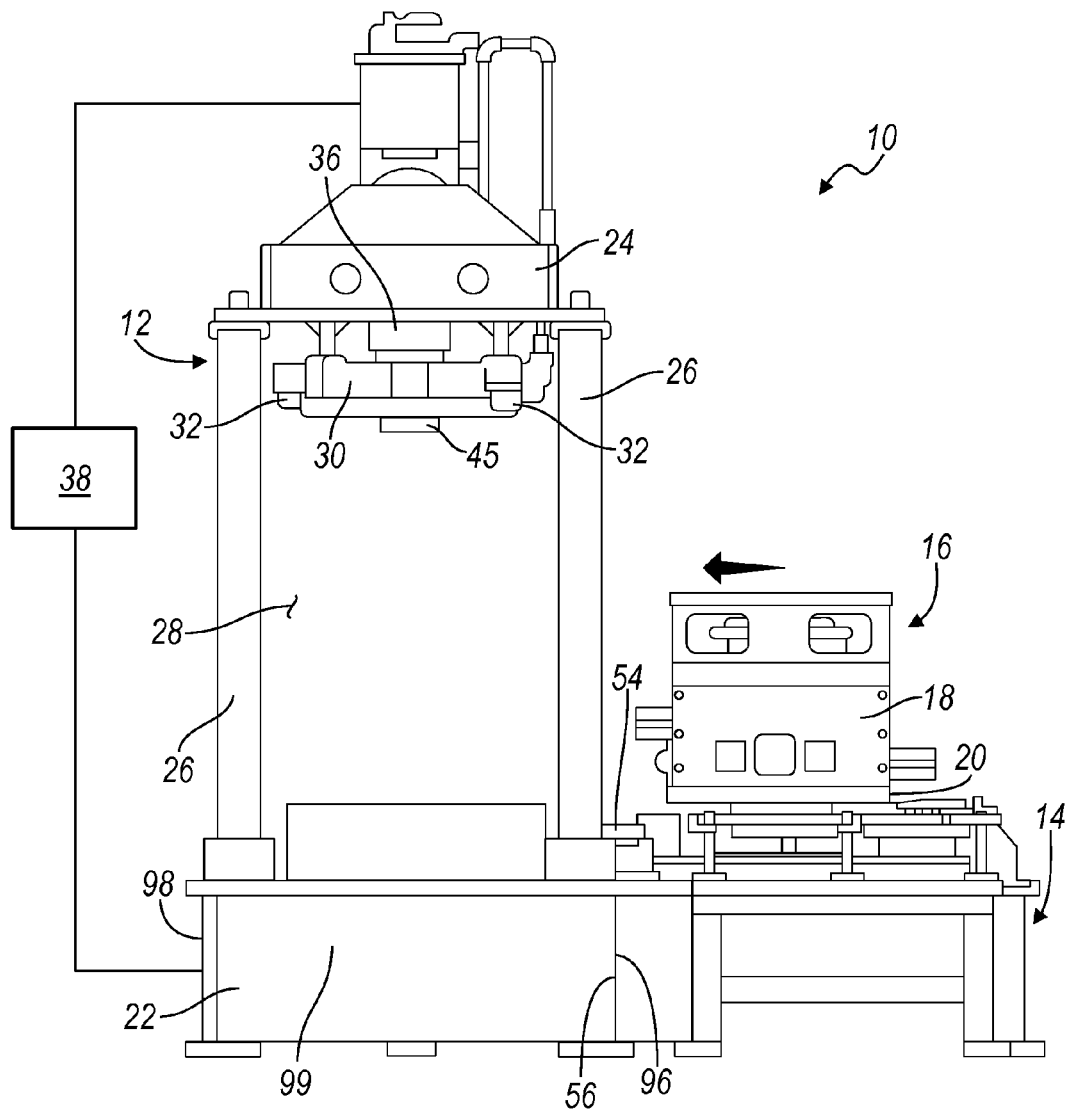
FIG. 1 is a side schematic view of a reconfigurable leak testing system prior to loading a testing fixture cartridge in a leak testing station, in accordance with the principles of the present disclosure.
Figure 2:
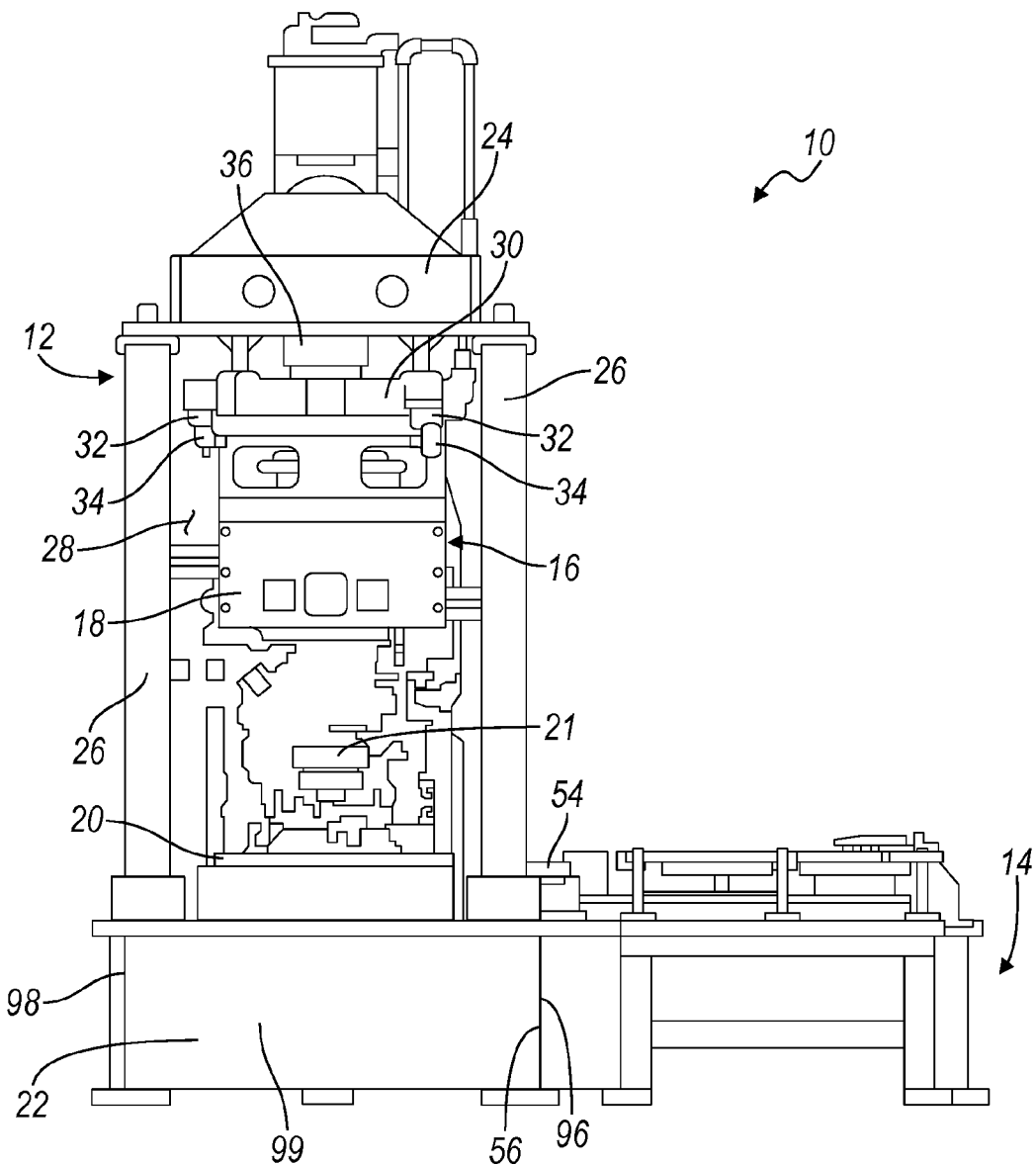
FIG. 2 is a schematic side view of the reconfigurable leak testing system of FIG. 1, wherein the testing fixture cartridge is loaded and engaged with the leak testing station, according to the principles of the present disclosure.

Referring to the drawings, wherein like reference numerals are used to identify like or identical components in the various views, FIGS. 1-2 illustrate a reconfigurable leak testing system 10 that includes a leak testing station 12, an off-shuttle cart 14, and one or more leak testing fixture cartridges 16. Each fixture cartridge 16 may include a respective upper fixture 18 and lower fixture 20. Furthermore, each fixture cartridge 16 may be independently translatable along the off-shuttle cart 14, which will be described in further detail below.

Figure 3:
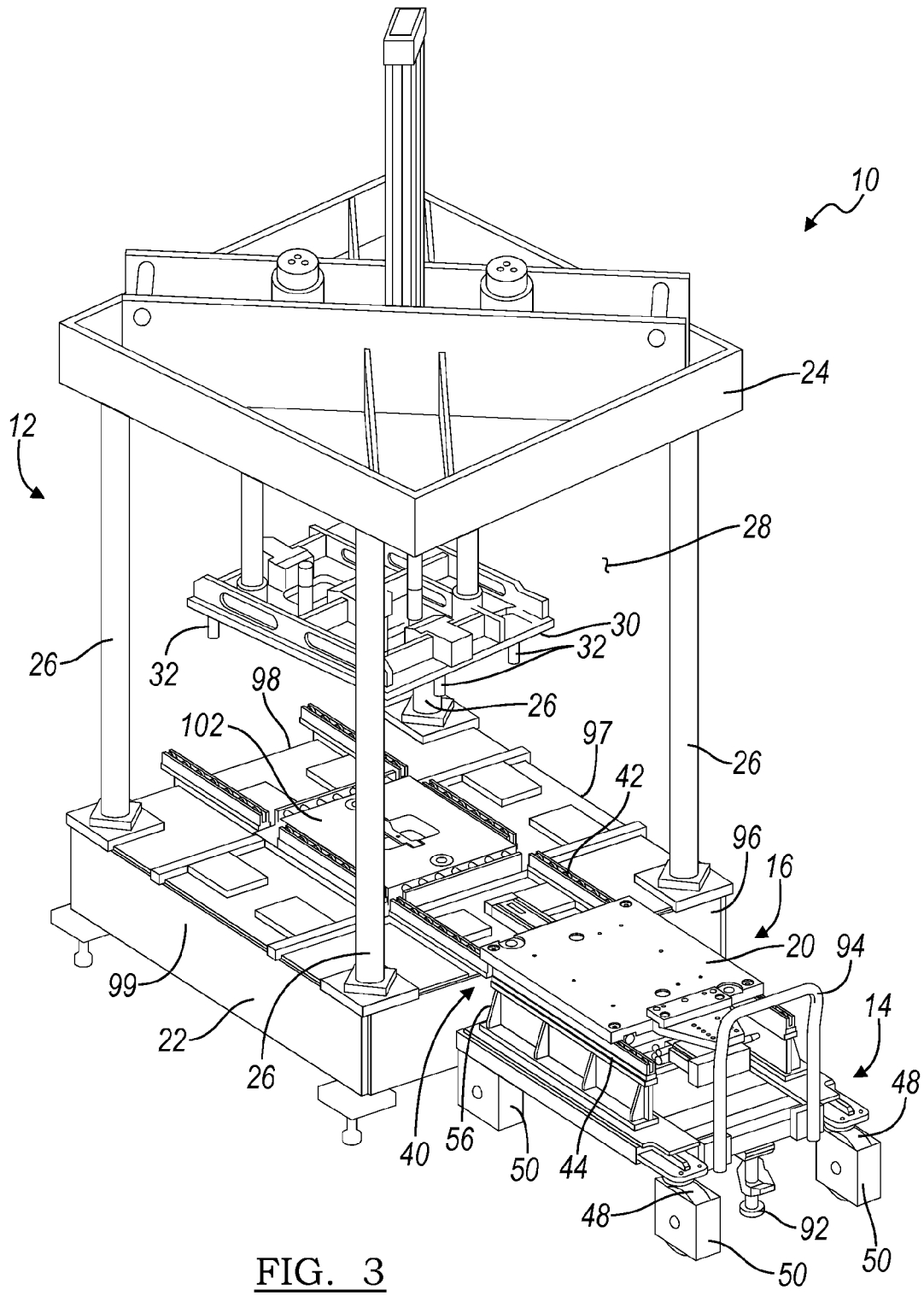
FIG. 3 is a perspective view of the reconfigurable leak testing system of FIGS. 1-2 prior to loading the testing fixture cartridge in the testing station, with a portion of the testing fixture cartridge removed, in accordance with the principles of the present disclosure.
Figure 4:
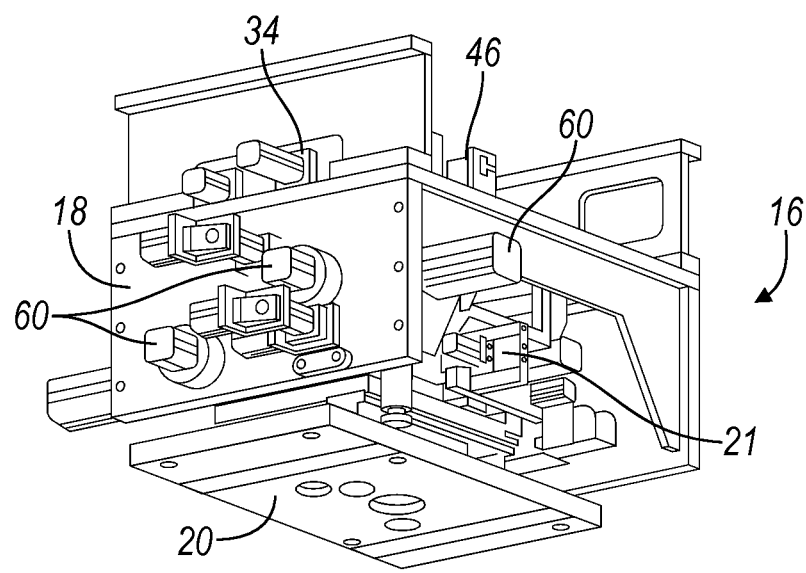
FIG. 4 is a perspective view of an example of a leak testing fixture cartridge, according to the principles of the present disclosure.

FIG. 3 also illustrates the leak testing system 10, but only the lower fixture 20 of the fixture cartridge 16 is illustrated, so as not to block from view additional details of the leak testing system 10. FIG. 4 illustrates the entirety of the fixture cartridge 16 having a part 21 disposed therein. As shown in FIG. 2, once the fixture cartridge 16 is shuttled into the leak testing station 12, the upper fixture 18 and the lower fixture 20 separate to accept a part 21.

As generally shown in FIG. 2, the leak testing station 12 may be configured to receive the fixture cartridge 16 from the off-shuttle cart 14. The leak testing station 12 generally has a lower base 22 and an upper base 24, which are separated by four legs 26 to define an open middle interior space 28.

A fixture interface 30 extends downwardly from the upper base 24. The leak testing station 12 may selectively engage with the upper fixture 18 using the fixture interface 30. The fixture interface 30 may include one or more mechanical or electromechanical interlocks 32, which may each selectively engage with a respective connection element 34 disposed on the upper fixture 18. In one embodiment, the interlocks 32 may include one or more mechanical latches that may engage one or more holes provided in the connection elements 34. In another embodiment, the connection elements 34 may be cylindrical posts with one or more protrusions or other connection features that may be engaged by the interlocks 32 to provide a quick-disconnect-type engagement. In still another embodiment, the interlocks 32 may include an electromagnetic actuator that may magnetically engage ferrous portions of the connection elements 34. As may be appreciated, other methods of actuated interconnection may similarly be used.

The leak testing station 12 may include an actuator 36 that may be configured to raise and lower the fixture interface 30. The actuator 36 may include a hydraulic actuator, servomotor, or other means of linear actuation. When the interlocks 32 are rigidly coupled with the upper fixture 18, the hydraulic actuator 36 may correspondingly raise and/or lower the upper fixture 18 relative to the lower fixture 20.

The leak testing station 12 may receive a fixture cartridge 16 from the off-shuttle cart 14 in an automated manner, such as though an automated conveyor system 40. The automated conveyor system 40 may include, for example, a conveyor belt or other active drive mechanism that may controllably translate a fixture cartridge 16 between the off-shuttle cart 14 and the leak testing station 12. Prior to a test, the automated conveyor system 40 may advance one respective cartridge 16 to a location within the leak testing station 12 and position it where the interface 30 may couple with the upper fixture 18 (e.g., using the interlocks 32, by way of example).

Figure 5:
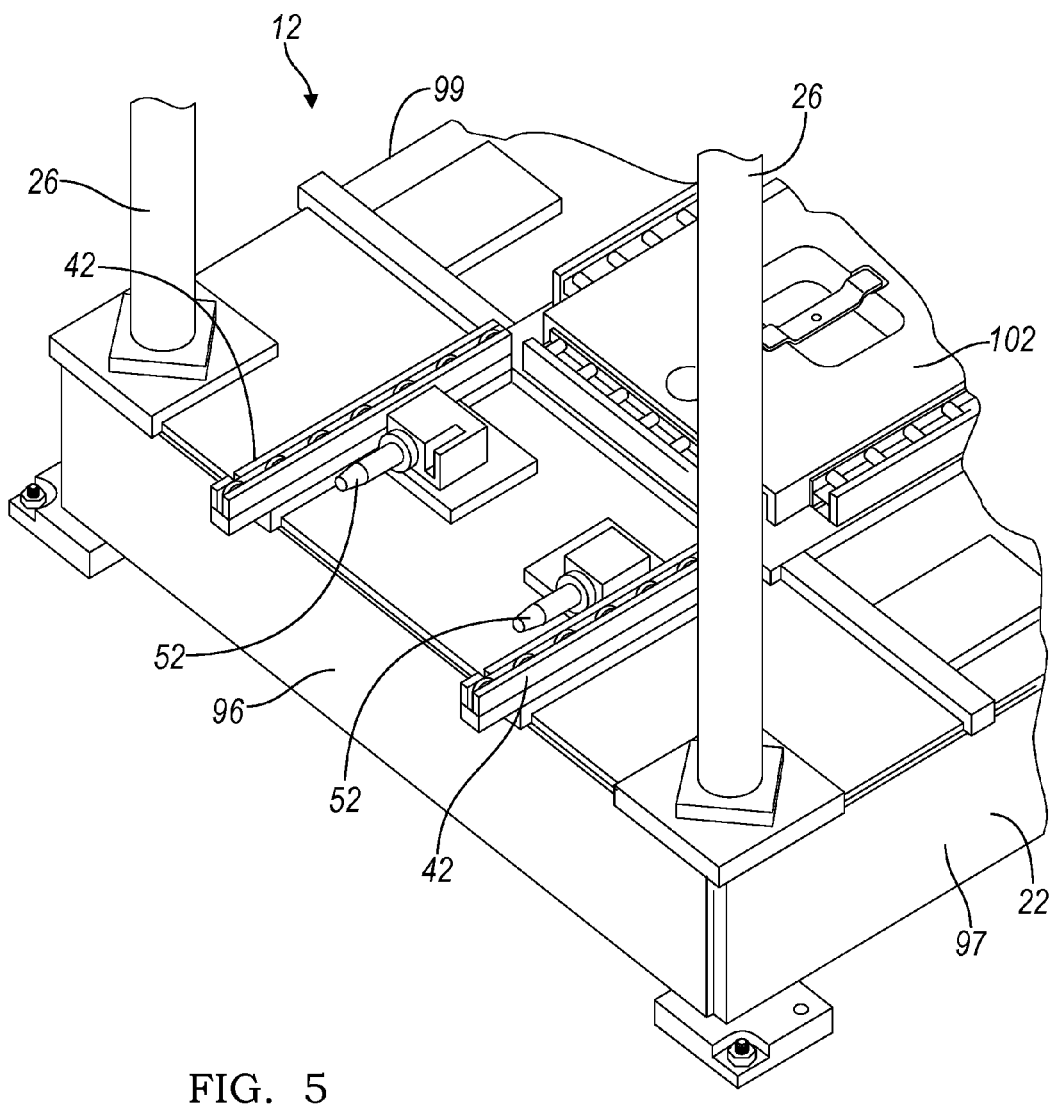
FIG. 5 is a perspective view of a portion of the reconfigurable leak testing system of FIGS. 1-3 prior to loading the testing fixture cartridge in the leak testing station, with a portion of the testing fixture cartridge removed, in accordance with the principles of the present disclosure.

The automated conveyor system 40 may include a station track 42 attached to the leak testing station 12 and a cart track 44 attached to the off-shuttle cart 14 (see FIGS. 3 and 5). The station track 42 and the cart track 44 are configured to cooperate to translate the fixture cartridge 16 between the off-shuttle cart 14 and the leak testing station 12. It should be appreciated that the automated conveyor system 40 may employ any similar material handling or part delivery technologies that may controllably maneuver and/or translate a fixture cartridge 16 from the off-shuttle cart 14 to the leak testing station 12.

A controller 38 (schematically illustrated in FIG. 1) may oversee and/or directly control the operation of both the leak testing station 12 and the automated conveyor system 40 throughout the fixture selection process and part testing routine. The controller 38 may be embodied, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

While shown as a single device in FIG. 1 for simplicity and clarity, the various elements of the controller 38 may be distributed over as many different hardware and software components as are required to optimally control the operation of the system 10. The individual control routines/systems resident in the controller 38 or readily accessible thereby may be stored in ROM or other suitable tangible memory location and/or memory device, and automatically executed by associated hardware components of the controller 38 to provide the respective control functionality. The controller 38 may include and/or be configured to interface with one or more programmable logic controllers, which are traditionally used to control automated assembly lines. For example, the controller 38 may include an electronic control module, a pneumatic control module, and a hydraulic control module, where each control module may manage one or more working aspects of various testing features 60 included with the fixture cartridge 16. As will be discussed in more detail below, the testing features 60 may include extendible seals, pressure transducers, clamps, and or other devices that may be specifically designed and/or positioned on the fixture cartridge 16 to interface with and leak test a part 21.

The electronic control module of the controller 38 may include, for example, low-voltage I/O circuitry that may be configured to control the operation of each respective testing feature 60. Additionally, the electronic control module may monitor the real-time status of each testing feature 60 to ensure proper and complete operation every testing cycle. The electronic control module may include multiple channels of I/O that it may use communicate with the fixture cartridge 16. The channels may be configured to be transmitted in either a parallel or a serial communication manner. The pneumatic control module may provide a regulated source of pressurized air to any testing feature 60 that may be pneumatically operated. Also, the hydraulic control module may provide a regulated source of pressurized fluid to any testing feature 60 that may be hydraulically operated. The pneumatic control module and/or hydraulic control module may each include one or more selectively actuatable fluid valves that may control flow along respectively coupled fluid lines.

As schematically illustrated in FIGS. 1-3, the fixture interface 30 may include a connection panel 45 that may allow any low-voltage electrical signals, pneumatic air, and/or hydraulic fluid to be provided from the controller 38 to the upper fixture 18. When the fixture interface 30 engages the upper fixture 18, the connection panel 45 of the interface 30 (i.e., the upper connection panel 45) may connect with a mating connection panel 46 disposed on the upper fixture 18 (i.e., the lower connection panel 46). Distinct electrical connections may be made between the panels 45, 46 for example, using standard pluggable electrical connectors, or other spring-based contact interfaces. Similarly, pneumatic and/or hydraulic connections may be made using one or more fluid couplings that may include any needed seals, o-rings, gaskets, and/or precision manufactured contact surfaces to discourage fluid leaks at the site of the connection. While the connection panel 45 in FIG. 1 is illustrated as a single connector block, it should be understood that multiple connector panels 45 may similarly be provided at various locations across the interface 30.

The off-shuttle cart 14 is removably attachable to the leak testing station 12. A plurality of different off-shuttle carts 14, each having a fixture cartridge 16 designed for use with a specific part 21, may be located near the leak testing feature 12 (or alternatively, the off-shuttle carts 14 may be stored in any desired place). When a specific part 21 is desired to be leak tested, the dedicated off-shuttle cart 14 for use with that part 21 is wheeled up to the leak testing station 12, via a plurality of swivel wheels 48 that are attached to the off-shuttle cart 14. Wheel covers 50 may be disposed over the wheels 48. In the alternative, the off-shuttle cart 14 may be movable by means other than wheels 48.

With reference to FIG. 5, the station track 42 of the leak testing station 12 may be used to align the off-shuttle cart 14 and its corresponding cart track 44 with the leak testing station 12 and the station track 42. The leak testing station 12 may have one or more station docking features 52, and the off-shuttle cart 14 may have one or more corresponding cart docking features 54 (see FIGS. 1, 2, and 6). The cart docking feature(s) 54 extend from a proximal side 56 of the off-shuttle cart 14, which is adjacent to a side 96, 97, 98, 99 of the leak testing station 12. Accordingly, the cart docking features 54 mate with the station docking features 52 to removably attach the off-shuttle cart 14 to the leak testing station 12.

Figure 6:
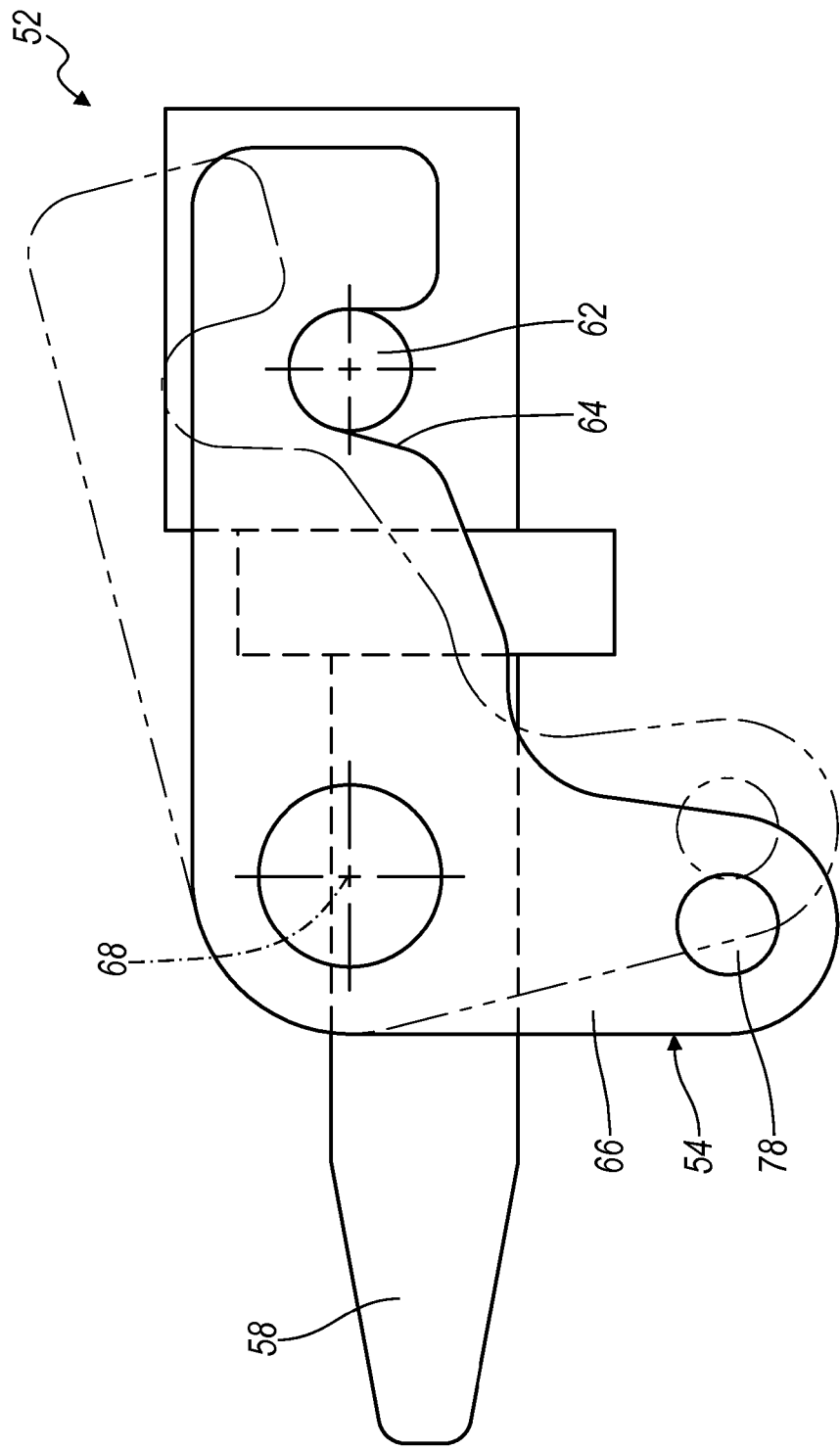
FIG. 6 is a front view of an example of a pair of docking features of the reconfigurable leak testing system of FIGS. 1-3 and 5, in accordance with the principles of the present disclosure.

Referring to FIG. 6, one variation of a station docking feature 52 and a cart docking feature 54 are illustrated. The station docking feature 52 includes an alignment pin 58 extending outwardly toward the proximal side 56 of the off-shuttle cart 14 when the off-shuttle cart 14 is located adjacent to the leak testing station 12. The station docking feature 52 also includes a latch pin 62. The cart docking feature 54 has a latch lever 66 forming a latch 64 therein that mates with the latch pin 62. The latch lever 66 of the cart docking feature 54 pivots downward on a pivot pin 68 to attach the latch 64 of the latch lever 66 to the latch pin 62. The latch lever 66 pivots upward (as shown in broken lines in FIG. 6) to detach the latch 64 of the latch lever 66 from the latch pin 62. The station docking feature 52 may also include a solenoid or small pneumatic cylinder (not shown) and/or a switch (not shown) to automatically mate the docking features 52, 54 together. The latch lever 66 may have a pull tab, handle, or grip portion 78 for manually unlatching the cart docking feature 54 from the station docking feature 52. It should be understood that FIG. 6 illustrates merely one example of docking features 52, 54 and that any other suitable docking features or none at all may alternatively be used.

Referring now to FIG. 3, a variation of the system 10 includes a vertical position adjuster 80 located on the off-shuttle cart 14. In FIG. 5, the vertical position adjuster 80 is shown as a pair of metal rails that lift the cart tracks 44 to the level of the station tracks 42. Alternatively, or in addition, the vertical position adjuster could include a linkage system. For example, the vertical position adjuster could include a plurality of levers pivotally connected to a base by base pivot pins. The levers could be further connected to platforms, for example, by platform pivot pins. The cart tracks 44 could be attached to the platforms. The levers could be pivoted about the pivot pins to move the platforms and the cart tracks 44 in a vertical direction to vertically align the cart tracks 44 with the station tracks 42.

The off-shuttle cart 14 may also have a brake 92 attached to a bottom end of the off-shuttle cart 14 for engaging a ground surface to brake the off-shuttle cart 14. In addition, the off-shuttle cart 14 may have a handle 94 for moving the off-shuttle cart 14 toward and away from the leak testing station 12. For example, the off-shuttle cart 14 can be moved manually or by a "tugger" machine.

Figure 7:
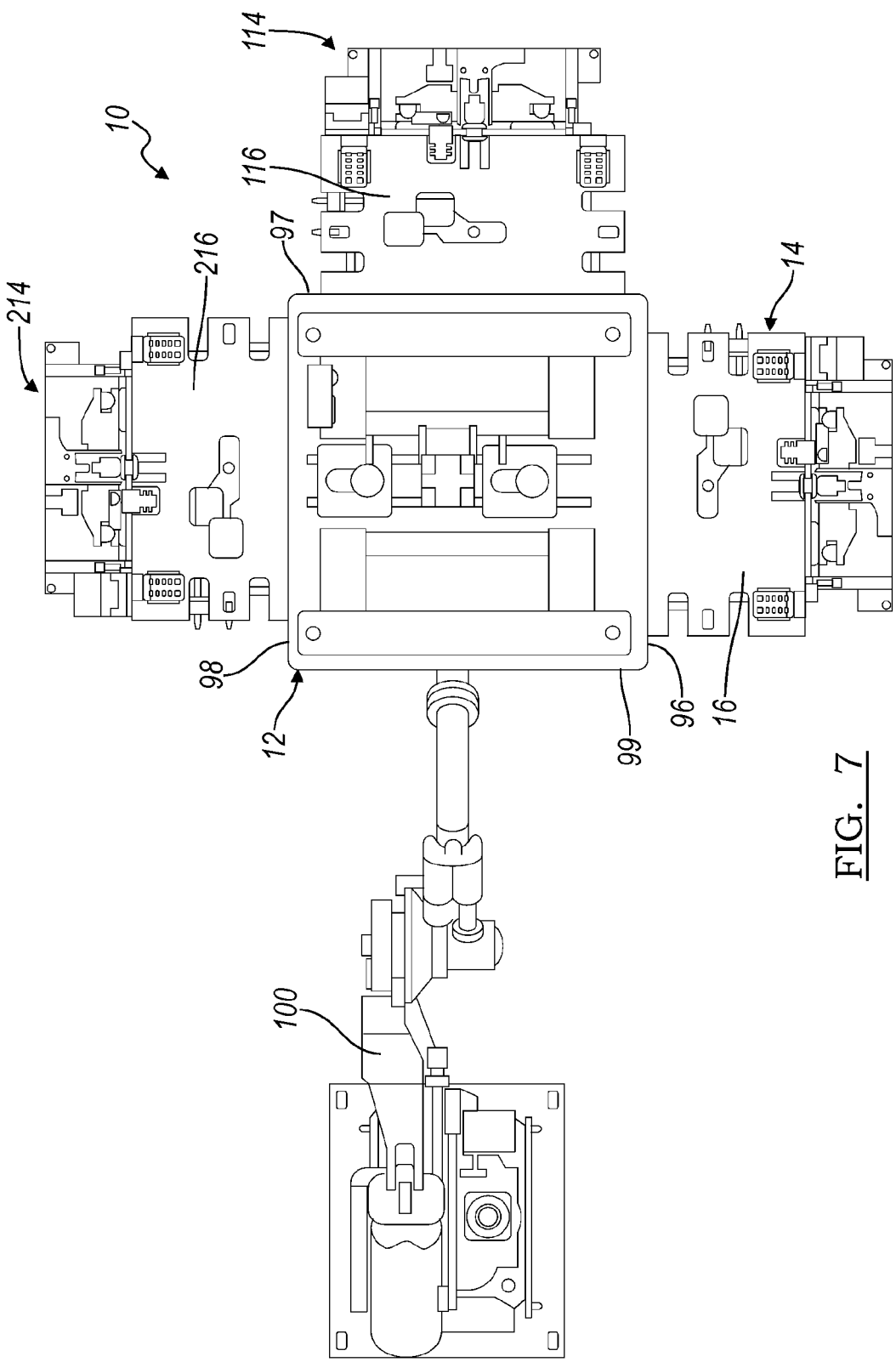
FIG. 7 is a plan view of the reconfigurable leak testing system of FIGS. 1-3 and 5, having multiple off-shuttle carts docked to the leak testing station, in accordance with the principles of the present disclosure.

Referring now to FIG. 7, the reconfigurable leak testing system 10 is illustrated overhead in a plan view, with the off-shuttle cart 14 removably attached to the leak testing station 12, for example, via the docking features 52, 54 hereinbefore described. The leak testing system 10 also has a second off-shuttle cart 114 and a third off-shuttle cart 214 in the illustrated embodiment. The second and third off-shuttle carts 114, 214 may be similar to the first off-shuttle cart 14 described above, except the second and third off-shuttle carts 114, 214 will likely have different fixture cartridges 116, 216 that are made to accommodate different parts for leak testing. Like the first off-shuttle cart 14 described above, the second and third off-shuttle carts 114, 214 are removably attachable and may be removably attached to the leak testing station 12.

The first off-shuttle cart 14 may be attached to a first side 96 of the leak testing station 12, or it may be attached to another side of the leak testing station 12. For example, the first off-shuttle cart 14 may be removably attached to a second side 97, a third side 98, or a fourth side 99 of the leak testing stand 12. Likewise, the second off-shuttle cart 114 and the third off-shuttle cart 214 may be removably attached to the first, second, third, or fourth side 96, 97, 98, 99 of the leak testing stand 12. In FIG. 7, the first off-shuttle cart 14 is removably attached to the first side 96 of the leak testing stand 12, the second off-shuttle cart 114 is removably attached to the second side 97 of the leak testing stand 12, and the third off-shuttle cart 214 is removably attached to the third side 98 of the leak testing stand 12. A robot arm 100 is disposed adjacent to the fourth side 99 of the leak testing stand 12 to place and remove parts, such as part 21, into and from the open middle interior space 28 of the leak testing stand 12.

To accommodate off-shuttle carts 14, 114, 214 on multiple sides 96, 97, 98, 99 of the leak testing stand 12, the leak testing stand 12 may have station tracks 42 extending toward each of its sides 96, 97, 98, 99. FIGS. 3 and 5 show stations tracks 42 extending toward its first and third sides 96, 98, but it should be understood that station tracks 42 could also extend toward the second and fourth sides 97, 99 to translate fixture cartridges 16, 116, 216 from off-shuttle carts 14, 114, 214 if the off-shuttle carts 14, 114, 214 are docked on the second or fourth sides 97, 99. Further, all of the sides 96, 97, 98, 99 could have station docking features 52 to removably attach off-shuttle carts 14, 114, 214, as described above.

Figure 8:
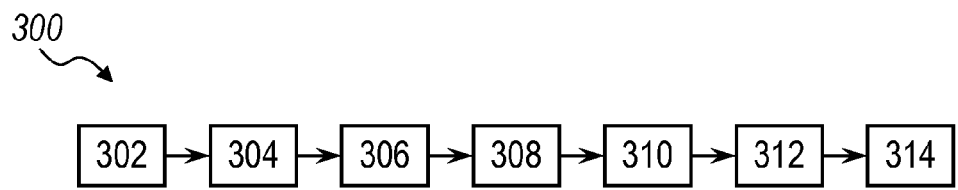
FIG. 8 is a flow diagram representing a method of leak testing a part using a reconfigurable leak testing system, according to the principles of the present disclosure.

As generally illustrated by the flow chart provided in FIG. 8, and graphically in FIGS. 3, 9, and 10A-10C, the present system 10 may be configured to leak test a thin-walled part 21 by first selecting the appropriate fixture cartridge 16, 116, 216 to accommodate the part. A method 300 of using the system 10, or another variation of the reconfigurable leak testing system 10, includes a step 302 of wheeling an off-shuttle cart 14, 114, 214 to a location adjacent to the leak testing station 12. An off-shuttle cart 14, 114, 214 is chosen based on the particular part 21 to be loaded for leak testing, and the off-shuttle cart 14, 114, 214 that has the appropriate fixture cartridge 16, 116, 216 is selected. The off-shuttle cart 14, 114, 214 is then removably attached, or docked, to the leak testing station 12 in a step 304. Different off-shuttle carts 14, 114, 214 may be removably attached (docked) to each side 96, 97, 98, 99 of the leak testing stand 12. The desired fixture cartridge 16, 116, 216 may be retrieved from one of the docked carts 14, 114, 214.

In a step 306, the desired fixture cartridge 16, 116, 216 from one of the docked off-shuttle carts 14, 114, 214 is then automatically (or manually) translated into the leak testing station 12. As described above, the fixture cartridge 16, 116, 216 may be translated via an automated conveyor system 40 that has a cart track 44 and a station track 42. The automated conveyor system 40 may be used to translate the cartridge 16, 216, 216 from the cart track 44, onto the station track 42, and then onto a center station 102 located on the base 22 of the leak testing station 12.

Knowledge of the design configuration of the part-to-be tested may allow the controller 38 to select and shuttle a suitably configured fixture cartridge 16 to the open middle interior space 28 within the leak testing station 12, if more than one off-shuttle cart 14, 114, 214 is removably attached to the leak testing station 12. In the alternative, an operator can select the appropriate fixture cartridge 16, 116, 216 by wheeling the corresponding off-shuttle cart 14, 114, 214 to the leak testing station 12 and docking that off-shuttle cart 14, 114, 214 to the leak testing station 12.

Figure 9:
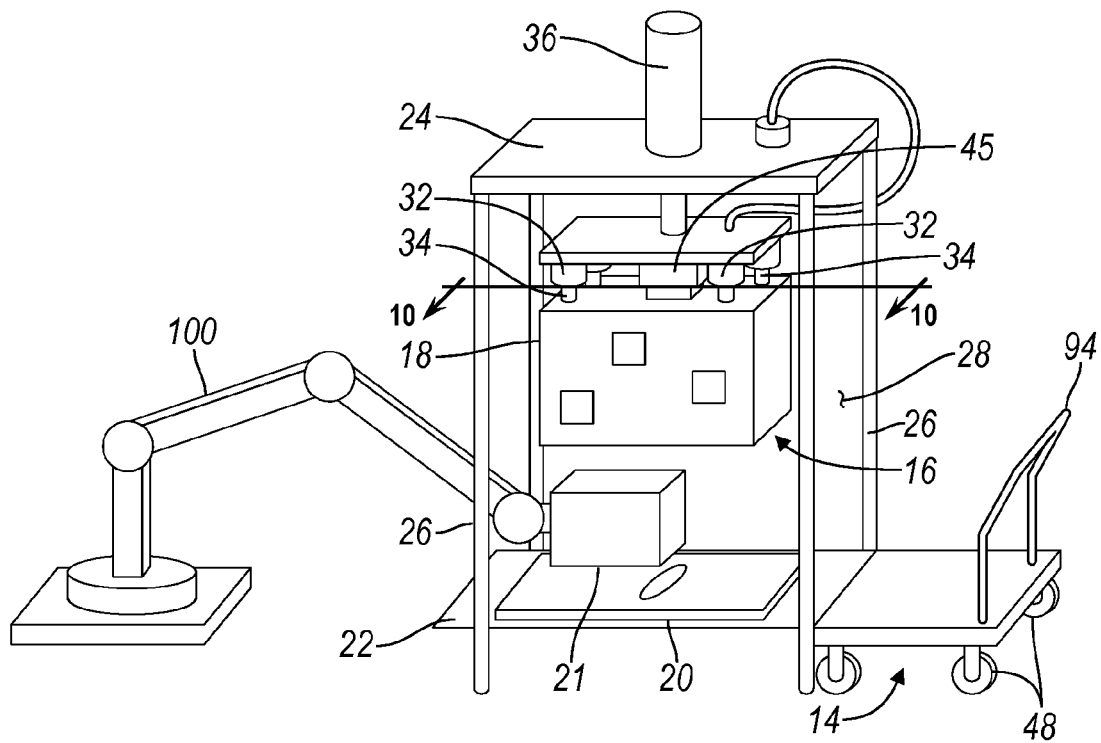
FIG. 9 is a schematic perspective view of the reconfigurable leak testing system of FIGS. 1-3, 5, and 7 receiving a cast part from a robotic arm, in accordance with the principles of the present disclosure.

As described above, the cartridge 16, 116, 216 may have an upper fixture 18 and a lower fixture 20, and the leak testing station 12 may separate the upper and lower fixtures 18, 20 of the cartridge 16, 116, 216 (as shown in FIG. 9), once the fixture cartridge 16, 116, 216 is translated onto the center station 102 of the leak testing station 12. In the manner described above, the station 12 may couple with the upper fixture 18 via the fixture interface 30 and lift the upper fixture 18 away from the lower fixture 20 using the hydraulic actuator 36. Examples of different fixture/part configurations are discussed below with respect to FIGS. 10A-10C.

Once the fixture cartridge 16, 116, 216 is loaded into the station 12, it may then receive a part-to-be-tested (step 308). After the upper and lower fixtures 18, 20 are separated and engaged by the leak testing station 12, the part 21 is received between the upper and lower fixtures 18, 20. The part 21 may be placed into the open middle interior space 28 of the leak testing station 12 and onto the lower fixture 20. The part 21 may be received between the upper and lower fixtures 18, 20 by a robotic arm 100, as shown in FIGS. 7 and 9, by way of example. In the alternative, the part 21 may be received by an operator manually placing it in the leak testing station 12, on a lower fixture 20. It is preferred that the fixture cartridge 16, 116, 216 is already located in the leak testing station 12 and separated at the time the part 21 is available for leak testing. The robotic arm 100 or operator may, for example, obtain the part 21 from an adjacent machining station or part bin, or may pull the part off of an adjacent assembly line. In still another configuration, other conveyor systems or material handling systems known in the art may be used to locate and position the part 21 on the lower fixture 20. Once the part 21 is positioned on the lower fixture 20, and positioned within the station 12, the actuator 36 may lower the upper fixture 18 down onto the part 21 (as generally represented by the schematic cross-sectional views in FIGS. 10A-10C, which are generally taken along line 10-10 from FIG. 9.

The method 300 further includes a step 310 of establishing a closed volume within the part 21. The closed volume may be partially defined by a wall/surface of the part 21, a surface of the lower fixture 20, a surface of the upper fixture 18, and/or one of the actuators 123, 124, 125 of the leak testing station 12 (see FIGS. 10A-10C). As used herein, a "closed" volume is one that is capable of being pressurized and/or maintaining such pressure absent any unintended openings (i.e., all design-intended openings are fluidly sealed by proper fixturing).

The volume may then be pressurized using a fluid, such as air (step 312). The method 300 may then include a step 314 of monitoring the pressurized fluid to detect fluid leakage. If a hole exits in the structure of the part 21, it is expected that the closed volume will not maintain a constant pressure.

Figure 10A:
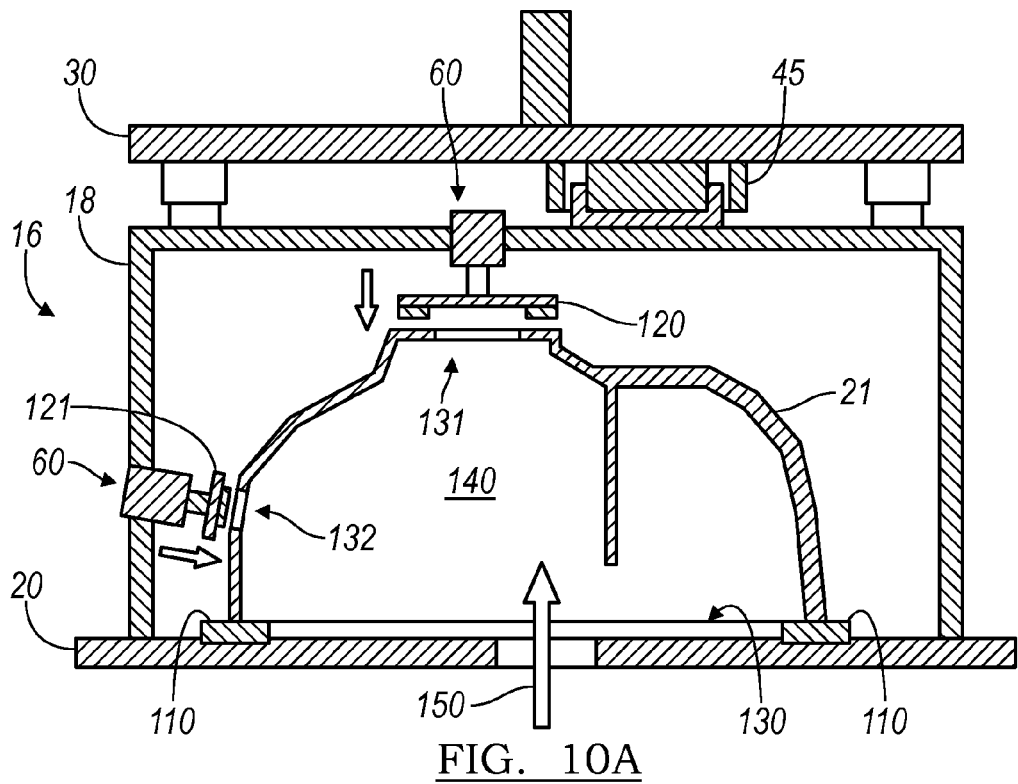
FIG. 10A is a schematic cross-sectional view of a first embodiment of a leak testing fixture cartridge within the reconfigurable leak testing system of FIGS. 1-3, 5-6, 7, and 9, generally taken along line 10-10 in FIG. 9, performing a leak test on a cast part, according to the principles of the present disclosure.
Figure 10B:
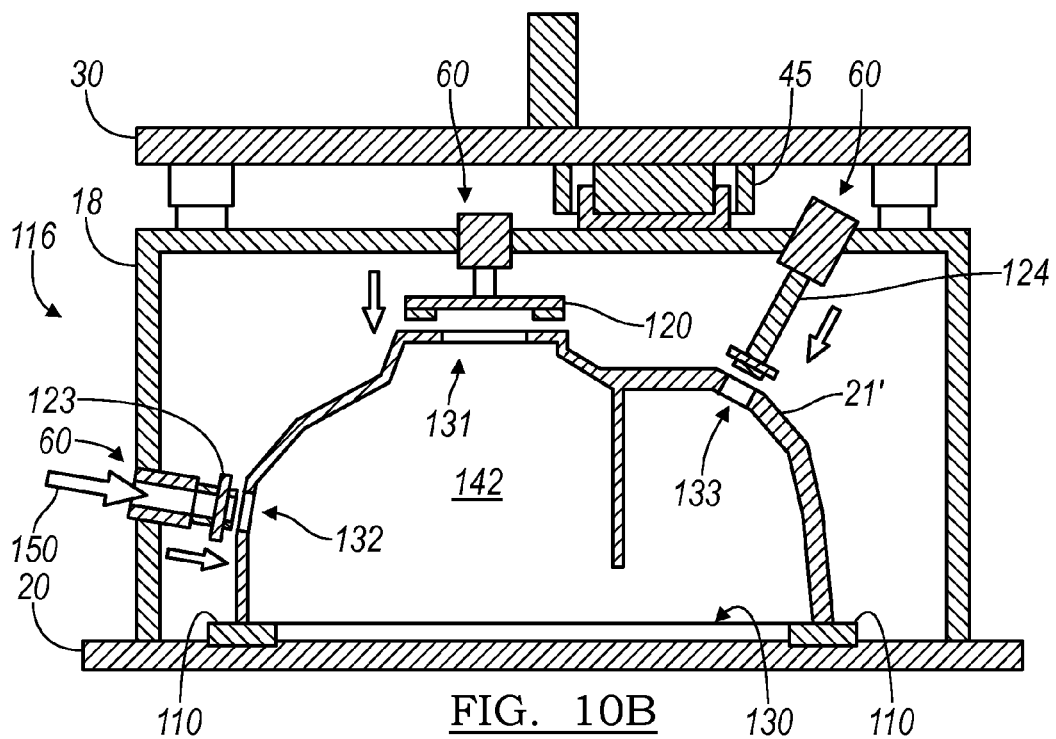
FIG. 10B is a schematic cross-sectional view of a second embodiment of a leak testing fixture cartridge within the reconfigurable leak testing system of FIGS. 1-3, 5-6, 7, and 9, generally taken along line 10-10 in FIG. 9, performing a leak test on a cast part, according to the principles of the present disclosure.
Figure 10C:
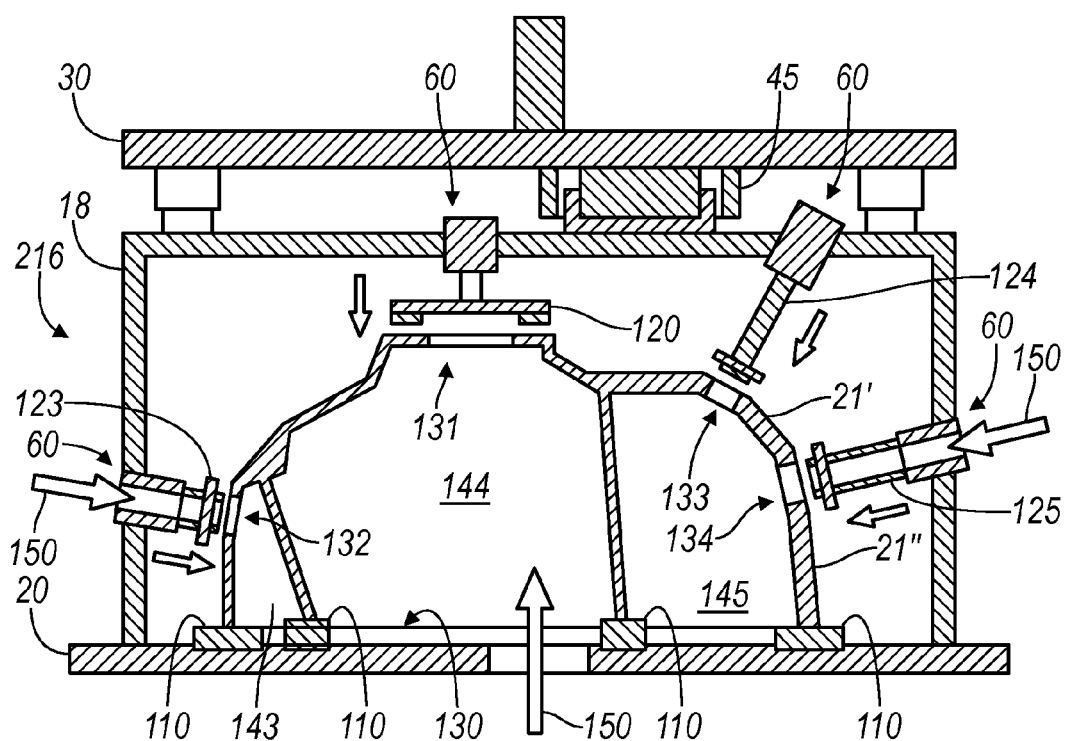
FIG. 10C is a schematic cross-sectional view of a third embodiment of a leak testing fixture cartridge within the reconfigurable leak testing system of FIGS. 1-3, 5-6, 7, and 9, generally taken along line 10-10 in FIG. 9, performing a leak test on a cast part, according to the principles of the present disclosure.

As shown in FIGS. 10A-10C, the step of creating a closed volume within the part 21 (which may be along a side of the part 21 (step 310)) may be performed using the upper and lower fixtures 18, 20, along with testing features 60 that may actively seal various orifices in the part 21, 21', 21". As illustrated, each part design (e.g., parts 21, 21', 21", respectively) may include a unique pattern of holes/orifices that, for example, may ultimately be used to connect hoses, tubes, or other devices/sensors to the respective part. In order to create a closed volume that may be capable of maintaining a pressure (step 310), each design-specified hole must be sealed. For example, the parts 21, 21', 21" may be various valve bodies, torque convertor housings, engine blocks, transmission cases, and/or cylinder heads.

More specifically, FIGS. 10A-10C each illustrate an embodiment of a fixture cartridge 16, 116, 216 that is respectively designed to seal a slightly different part 21, 21', 21". In each embodiment, the respective part 21, 21', 21" may seal, in part, against the lower fixture 20 with the aid of an elastomeric seal 110. A hydraulically actuated clamp 120 may apply a controlled compressive force to each part 21, 21', 21", which may urge the part into adequate sealing contact with the seal 110. It should be understood that a pneumatic, mechanical, or electromechanical clamp may likewise be substituted for the hydraulic clamp.

Referring to FIG. 10A, the part 21 may include, for example three distinct openings 130, 131, 132. When sealed, the part 21, along with any sealing mechanisms or actuatable testing features, may define a volume 140. As described above, opening 130 may be sealed using the lower fixture 20, along with an actuatable testing features, such as seal 110. Similarly, another actuatable testing features, such as a hydraulically actuated clamp 120, may be configured to seal opening 131, which also applying a compressive force against the part 21. Finally, opening 132 may be sealed by a third actuatable testing feature, which may be a hydraulically actuated plunger 121 that extends to effectively plug the opening 132. The plunger 121 may include one or more gaskets or o-ring seals to enhance its ability to provide a leak-resistant seal. After the upper fixture 18 is lowered onto the part 21, the clamp 120 and plunger 121 may be actuated (via the controller 38) to advance toward the part 21 until they contact the part 21 with a minimum threshold amount of force to fluidly close volume 140.

FIG. 10B illustrates the sealing of a part 21' that is similar in design to the part 21 provided in FIG. 10A, though which includes a fourth opening 133. As illustrated, the lower fixture 20 may seal opening 130, the clamp 120 may seal opening 131, a first hydraulically actuated plunger 123 may be used to seal opening 132, and a second hydraulically actuated plunger 124 may be used to seal opening 133. Together, the part 21', lower fixture 20, clamp 120, and plungers 123, 124 may define a volume 142.

Finally, FIG. 10C, illustrates an embodiment of the part 21" that includes five distinct openings 130, 131, 132, 133, and 134. In this embodiment, openings 130-133 are sealed in a similar manner as provided in FIG. 10B, while opening 134 is sealed by a third hydraulically actuated plunger 125. Once the clamp 120 and plungers 123, 124, 125 are actuated, three distinct volumes 143, 144, 145 may be defined that may each need to be leak-tested.

While FIGS. 10A-10C generally illustrate three similar manners of creating a closed volume, these techniques are meant to be purely illustrative. It is contemplated that one skilled in the techniques of part fixturing could create similar fixturing arrangements to seal any thin-walled part 21, 21', 21" that is desired to be leak tested. The specific arrangement of plungers, clamps, seals, or other actuatable testing features should not be used to limit the scope of the present invention.

Referring again to FIG. 8, once the fixtures 18, 20 effectively seal the part 21, 21', 21" to create one or more closed volumes, the respectively created one or more closed volumes may be pressurized by a fluid, such as air (step 312). As generally illustrated in FIGS. 10A-10C, this pressurization may occur by supplying pressurized fluid, such as pressurized air 150, in a controlled manner through a fluid supply opening that may be provided in one or more plungers (e.g., plungers 123, 125) and/or provided in the lower fixture 20. For the purpose of creating a "closed volume," as discussed above, the volume should be considered "closed" if there are no design-intended openings in the part except for the one or more fluid supply openings).

Figure 11A:
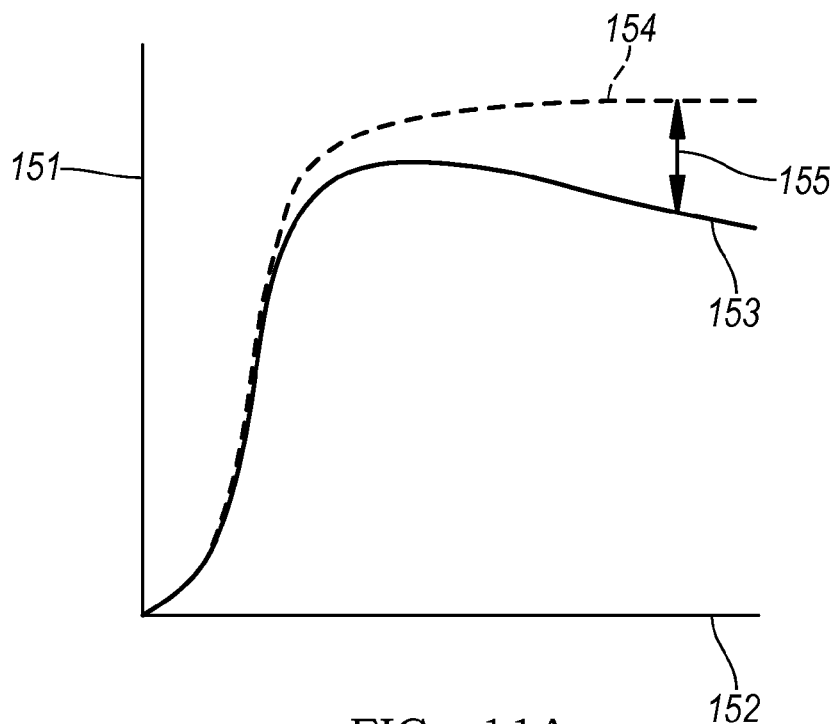
FIG. 11A is a graph comparing an actual monitored volume pressure, in the presence of a fluid leak, to an expected volume pressure if no leak were present, in accordance with the principles of the present disclosure.
Figure 11B:
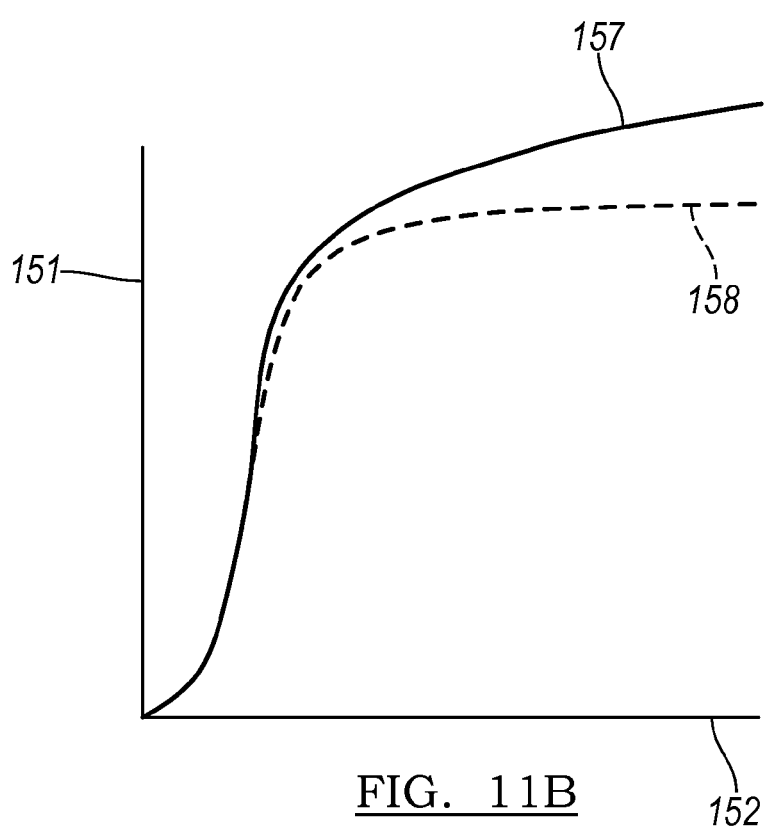
FIG. 11B is a graph comparing an actual monitored total mass-flow of pressurized fluid into the volume, in the presence of a fluid leak, to an expected total mass-flow if no leak were present, according to the principles of the present disclosure.

To detect a leak (step 314), the controller 38 may compare a sensed parameter of the pressurized fluid within the closed volume to an expected value of the same parameter. For example, the controller 38 may monitor the actual pressure of the volume, such as through a pressure sensor integrated into a plunger (e.g., plunger 121) or integrated into the lower fixture 20. As generally illustrated in FIG. 11A, where the vertical axis represents volume pressure 151 and the horizontal axis represents time 152, the controller 38 may then compare the actually sensed pressure profile 153 with an expected pressure profile 154, given a fixed duration pressurization period. If there is a fall off or deviation 155 in actual pressure 152 (as shown), the controller 38 may indicate that a leak exists. Alternatively, as generally illustrated in FIG. 11B, the controller 38 may detect a leak by monitoring the flow of air into the volume using a mass-flow sensor provided between the pneumatic control module 52 and the volume, where the vertical axis represents total mass-flow 156 of air into the volume and the horizontal axis represents time 152. The controller 38 may then compare the actual total mass-flow 157 of air entering the volume with an expected total mass-flow 158. If air 150 is continuously flowing into the volume after it is expected to be fully pressurized, the controller 38 may indicate that a leak exists.

To ensure that any leak (e.g., sensed pressure drop, or continuously increasing mass-air flow) is attributable to the part 21, 21', 21", and not the fluid couplings between the interface 30 and the upper fixture 18, the fluid couplings may be separately leak tested prior to testing a part 21, 21', 21". The coupling-test may be performed by closing a valve 160 provided on the upper fixture 18 between the lower connection panel 46 and the various testing features 60. A testing routine similar to steps 312 and 314 (above) may then be performed to test the integrity of the fluid couplings provided between the connection panels 45, 46. For example, the various fluid lines extending from the pneumatic and/or hydraulic control modules may be pressurized up to the closed valve 160. The line pressure and/or mass-flow of fluid into the lines may then be monitored at the controller 38 to determine whether any fluid loss at the coupling exists, which may be indicative of a leak. Such a test may be performed during an initialization routine executed after a new cartridge 16, 116, 216 is loaded into the station 12.

Finally, following completion of the testing routine (i.e., following step 314), each plunger, clamp, or other actuatable testing feature 60 engaged with the part 21, 21', 21" may retract (i.e., disengage) from the part and return to a "home" state. This retraction may be separately verified by one or more sensors associated with each feature 60, and communicated to the controller 38 via the electronic control module. Once it is verified that all testing features 60 are disengaged from the part 21, 21', 21", the actuator 36 may lift the upper fixture 18 from the lower fixture 20, and the part 21, 21', 21" may be retrieved. Following the part 21, 21', 21" removal, either a new, similar part may be loaded for testing, or the actuator 36 may lower the upper fixture 18 back onto the lower fixture 20, where the entire cartridge 16, 116, 216 may be swapped with a different fixture cartridge 16, 116, 216 from a different off-shuttle cart 14, 114, 214.

Those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for illustrative purposes to aid the reader's understanding of the present invention, and do not create limitations, particularly as to the position, orientation, or use of the invention. It is contemplated that the upper fixture 18 may comprise multiple distinct portions that may each include their own separate actuator 36 and/or fixture interface 30. It is similarly contemplated that the actuators 36 need not lift the upper cartridge 18 in strictly a "vertical" direction. It is intended that all matter contained in the above description or shown in the accompanying drawings shall be interpreted as illustrative only and not as limiting.

The description of the invention is merely exemplary in nature and variations that do not depart from the gist of the invention are intended to be within the scope of the invention. Such variations are not to be regarded as a departure from the spirit and scope of the invention.

The invention claimed is:

1. A reconfigurable leak testing system comprising:
   a leak testing station;
   an off-shuttle cart removably attachable to the leak testing station; and
   a fixture cartridge translatable between the off-shuttle cart and the leak testing station, the fixture cartridge configured to selectively couple with the leak testing station, the fixture cartridge including an upper fixture, a lower fixture, and an actuatable testing feature,
   an automated conveyor system configured to translate the fixture cartridge between the off-shuttle cart and the leak testing station,
   wherein the fixture cartridge is configured to receive a part between the upper fixture and lower fixture, the actuatable testing feature being configured to contact the part, the automated conveyor system includes a station track attached to the leak testing station and a cart track attached to the off-shuttle cart, and the station track and the cart track are configured to cooperate to translate the fixture cartridge between the off-shuttle cart and the leak testing station, and
   wherein a closed volume is defined at least partially by the actuatable testing feature and the part.

2. The reconfigurable leak testing system of claim 1, wherein the leak testing station has a station docking feature and the off-shuttle cart has a cart docking feature, the cart docking feature being configured to mate with the station docking feature to removably attach the off-shuttle cart to the leak testing station.

3. The reconfigurable leak testing system of claim 2, further comprising a vertical position adjuster configured to adjust the cart track in a vertical direction to align the cart track with the station track.

4. The reconfigurable leak testing system of claim 3, further comprising a plurality of wheels attached to the off-shuttle cart.

5. The reconfigurable leak testing system of claim 4, further comprising a brake attached to the off-shuttle cart, the brake being configured to engage a ground surface to brake the off-shuttle cart.

6. The reconfigurable leak testing system of claim 5, wherein the off-shuttle cart is a first off-shuttle cart, the reconfigurable leak testing system further comprising a second off-shuttle cart, the second off-shuttle cart being removably attachable to the leak testing station.

7. The reconfigurable leak testing system of claim 6, further comprising a third off-shuttle cart, the third off-shuttle cart being removably attachable to the leak testing station.

8. The reconfigurable leak testing system of claim 7, wherein the station docking feature is a first station docking feature extending from a first side of the leak testing station, the reconfigurable leak testing system further comprising a second station docking feature extending from a second side of the leak testing station and a third station docking feature extending from a third side of the leak testing station, the second off-shuttle cart having a cart docking feature and the third off-shuttle cart having a cart docking feature, and wherein the cart docking features of the first, second, and third off-shuttle carts are each configured to mate with each of the first, second, and third station docking features to removably attach the first, second, and third off-shuttle carts respectively to one of the first, second, and third sides of the leak testing station.

9. The reconfigurable leak testing system of claim 6, wherein the leak testing station includes an actuator and a fixture interface coupled with the actuator, the fixture interface including a plurality of interlocks configured to selectively couple with the upper fixture of the fixture cartridge, the actuator being configured to selectively raise and lower the fixture interface.

10. The reconfigurable leak testing system of claim 9, wherein the fixture interface includes a connection panel configured to couple with the upper fixture, the connection panel including an electrical connector and a fluid connector, wherein the electrical connector provides an electrical connection between the leak testing station and the fixture cartridge, and wherein the fluid connector provides a pneumatic or hydraulic fluid connection between the leak testing station and the fixture cartridge.

11. The reconfigurable leak testing system of claim 10, further comprising a controller configured to control the actuation of the actuatable testing feature.

12. The reconfigurable leak testing system of claim 11, wherein the controller is further configured to pressurize the closed volume by providing a pressurized fluid to the volume.

13. The reconfigurable leak testing system of claim 12, wherein the controller is configured to detect a leak in the volume by monitoring the pressure of the closed volume when the closed volume is pressurized and detecting any pressure deviations from an expected pressure.

14. The reconfigurable leak testing system of claim 13, wherein the controller is configured to detect a leak in the closed volume by monitoring the total mass-flow of the pressurized fluid provided to the closed volume, and by comparing the monitored mass-flow to an expected total mass-flow.

15. The leak testing system of claim 14, wherein the actuatable testing feature includes at least one of an extendable seal and an extendable clamp.

16. A reconfigurable leak testing system comprising:
a leak testing station having a first side and a second side, the leak testing station having a first station docking feature disposed adjacent to the first side and a second station docking feature disposed adjacent to the second side;
a first off-shuttle cart removably attachable to the first and second sides of the leak testing station, the first off-shuttle cart having a first cart docking feature configured to mate with the first and second station docking features such that mating the first cart docking feature with one of the first and second station docking features removably attaches the first off-shuttle cart to the leak testing station, the first off-shuttle cart having a plurality of first wheels attached to the first off-shuttle cart;
a second off-shuttle cart removably attachable to the first and second sides of the leak testing station, the second off-shuttle cart having a second cart docking feature configured to mate with the first and second station docking features such that mating the second cart docking feature with one of the first and second station docking features removably attaches the first off-shuttle cart to the leak testing station, the second off-shuttle cart having a plurality of second wheels attached to the second off-shuttle cart;
a first fixture cartridge translatable between the first off-shuttle cart and the leak testing station, the first fixture cartridge configured to selectively couple with the leak testing station, the first fixture cartridge including a first upper fixture, a first lower fixture, and a plurality of first actuatable testing features, wherein the first fixture cartridge is configured to receive a first part between the first upper fixture and the first lower fixture, the plurality of first actuatable testing features being configured to contact the first part, and wherein a first closed volume is defined at least partially by the plurality of first actuatable testing features and the first part;
a second fixture cartridge translatable between the second off-shuttle cart and the leak testing station, the second fixture cartridge configured to selectively couple with the leak testing station, the second fixture cartridge including a second upper fixture, a second lower fixture, and a plurality of second actuatable testing features, wherein the second fixture cartridge is configured to receive a second part between the second upper fixture and the second lower fixture, the plurality of second actuatable testing features being configured to contact the second part, and wherein a second closed volume is defined at least partially by the plurality of second actuatable testing features and the second part; and
an automated conveyor system configured to translate the first and second fixture cartridges between the first and second off-shuttle carts respectively and the leak testing station, the automated conveyor system including a station track attached to the leak testing station and first and second cart tracks attached to the first and second off-shuttle carts respectively, the station track and the first cart track being configured to cooperate to translate the first fixture cartridge between the first off-shuttle cart and the leak testing station, the station track and the second cart track being configured to cooperate to translate the second fixture cartridge between the second off-shuttle cart and the leak testing station.

17. The reconfigurable leak testing system of claim 16, wherein the leak testing station includes an actuator and a fixture interface coupled with the actuator, the fixture interface including a plurality of interlocks configured to selectively couple with the first and second upper fixtures of the first and second fixture cartridges, the actuator being configured to selectively raise and lower the fixture interface, the fixture interface including a connection panel configured to couple with the first and second upper fixtures, the connection panel including an electrical connector and a fluid connector, wherein the electrical connector provides an electrical connection between the leak testing station and the first and second fixture cartridges, and wherein the fluid connector provides a pneumatic or hydraulic fluid connection between the leak testing station and the first and second fixture cartridges, the reconfigurable leak testing system further comprising a controller configured to control the actuation of the plurality of first and second actuatable testing features, the controller being configured to pressurize the first and second closed volumes by providing a pressurized fluid to the first and second closed volumes, the controller being configured to detect a leak in the first closed volume, and the controller being configured to detect a leak in the second closed volume.

18. A method of leak testing a part using a reconfigurable leak testing system, the method comprising:
wheeling an off-shuttle cart to a location adjacent to a leak testing station;
removably attaching the off-shuttle cart to the leak testing station;
automatically translating a fixture cartridge into the leak testing station, the fixture cartridge being provided with upper and lower fixtures;
receiving a part between the upper and lower fixtures;
establishing a closed volume within the part;
pressurizing the closed volume using a pressurized fluid; and
monitoring the pressurized fluid to detect fluid leakage.

* * * * *